US011590881B2

(12) United States Patent
Funk et al.

(10) Patent No.: US 11,590,881 B2
(45) Date of Patent: Feb. 28, 2023

(54) MOTOR VEHICLE HAVING AT LEAST ONE HEADLIGHT WITH SEPARATELY ACTUATED LIGHT SEGMENTS

(71) Applicant: AUDI AG, Ingolstadt (DE)

(72) Inventors: Christian Funk, Sandhausen (DE); Florenz Barmeyer, Ingolstadt (DE); Tilman Armbruster, Ingolstadt (DE); Carsten Gut, Überlingen (DE); Said Omerbegovic, Frankfurt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/084,115

(22) PCT Filed: Mar. 15, 2017

(86) PCT No.: PCT/EP2017/056151
§ 371 (c)(1),
(2) Date: Oct. 18, 2018

(87) PCT Pub. No.: WO2017/158044
PCT Pub. Date: Sep. 21, 2017

(65) Prior Publication Data
US 2019/0202343 A1    Jul. 4, 2019

(30) Foreign Application Priority Data
Mar. 17, 2016    (DE) .................... 10 2016 003 296.0

(51) Int. Cl.
*B60Q 1/14*    (2006.01)
*F21S 41/255*    (2018.01)
(Continued)

(52) U.S. Cl.
CPC ............. *B60Q 1/143* (2013.01); *B60Q 1/085* (2013.01); *F21S 41/153* (2018.01);
(Continued)

(58) Field of Classification Search
CPC ................ B60Q 2300/42; B60Q 1/085; B60Q 2300/056; B60Q 2300/41; B60Q 1/143;
(Continued)

(56) References Cited

U.S. PATENT DOCUMENTS 10,239,440 B2    3/2019  Asaoka
2004/0179367 A1*  9/2004  Takeda ..................... B60Q 1/04
                                                           362/466
(Continued)

FOREIGN PATENT DOCUMENTS

CN       102349351 A    2/2012
DE       19737653 A1    3/1999
(Continued)

OTHER PUBLICATIONS

Muyan-Ozcelik et al. ("GPU Computing in Tomorrow's Automobiles"; published online: Oct. 7, 2014) (Year: 2014).*
(Continued)

*Primary Examiner* — Wei (Victor) Y Chan
(74) *Attorney, Agent, or Firm* — Sterne, Kessler, Goldstein & Fox P.L.L.C.

(57) ABSTRACT

A motor vehicle having at least one headlight for illuminating the surroundings of the motor vehicle and a control device for controlling the headlight, wherein the headlight comprises a plurality of lighting segments that are arranged in the manner of a matrix and that can be actuated separately by the control device for providing a lighting brightness that can be predefined separately for the individual lighting segments, wherein the control parameter predefining the specific lighting brightness for each of the lighting segments can be calculated by the control device in at least one computing step as a function of input parameters that can be provided by at least one vehicle device, wherein the computing step or at least one of the computing steps may be
(Continued)

executed in parallel by the control device for a plurality of the lighting segments.

9 Claims, 2 Drawing Sheets

(51) Int. Cl.
*F21S 41/64* (2018.01)
*F21S 41/675* (2018.01)
*F21S 41/663* (2018.01)
*B60Q 1/08* (2006.01)
*F21S 41/153* (2018.01)
*F21Y 105/16* (2016.01)
*F21Y 115/10* (2016.01)

(52) U.S. Cl.
CPC .......... *F21S 41/255* (2018.01); *F21S 41/645* (2018.01); *F21S 41/663* (2018.01); *F21S 41/675* (2018.01); *F21Y 2105/16* (2016.08); *F21Y 2115/10* (2016.08)

(58) Field of Classification Search
CPC .......... B60Q 2300/054; B60Q 2300/45; B60Q 1/0023; B60Q 1/04; B60Q 2300/112; B60Q 1/1423; B60Q 1/26; H05B 33/0815; H05B 33/0851; H05B 33/0854
See application file for complete search history.

(56) References Cited

U.S. PATENT DOCUMENTS

| | | |
|---|---|---|
| 2007/0195270 A1 | 8/2007 | Hull et al. |
| 2010/0073480 A1 | 3/2010 | Hoek et al. |
| 2011/0012511 A1 | 1/2011 | Watanabe |
| 2011/0267455 A1 | 11/2011 | Götz et al. |
| 2011/0316448 A1 | 12/2011 | Ashdown |
| 2013/0058116 A1 | 3/2013 | Galbas et al. |
| 2013/0257274 A1 | 10/2013 | Sekiguchi |
| 2013/0343051 A1 | 12/2013 | Holman et al. |
| 2014/0175978 A1* | 6/2014 | Kobayashi ........... B60Q 1/1423 315/82 |
| 2015/0009694 A1 | 1/2015 | Sekiguchi et al. |
| 2016/0073000 A1 | 3/2016 | Abelé et al. |
| 2017/0225609 A1* | 8/2017 | Tsuzuki ................ F21S 41/657 |
| 2018/0253609 A1* | 9/2018 | Potter ................ G06K 9/00791 |

FOREIGN PATENT DOCUMENTS

| | | |
|---|---|---|
| DE | 102007040042 A1 | 2/2009 |
| DE | 102008044676 A1 * | 3/2010 ............ B60Q 1/085 |
| DE | 102008044676 A1 | 3/2010 |
| DE | 102011081382 A1 | 2/2013 |
| DE | 102013102144 A1 | 10/2013 |
| DE | 102013021941 A1 | 7/2015 |
| DE | 102014108239 A1 | 12/2015 |
| DE | 102014111083 A1 | 2/2016 |
| EP | 2347931 A1 | 7/2011 |
| EP | 2957462 A1 | 12/2015 |
| WO | WO 2015/054797 A1 | 4/2015 |
| WO | WO 2015/189672 A1 | 12/2015 |
| WO | WO 2015/190299 A1 | 12/2015 |

OTHER PUBLICATIONS

International Search Report and Written Opinion of the International Searching Authority directed to related International Patent Application No. PCT/EP2017/056151, dated Jun. 16, 2017, with attached English-language translation; 26 pages.

International Preliminary Report on Patentability directed to related International Patent Application No. PCT/EP2017/056151, dated Mar. 12, 2018, with attached English-language translation; 16 pages.

Office Action filed in application No. EP017710925.3. dated May 14, 2020; 6 pages.

Office Action filed in application No. CN 201780017654.7, with attached English-language translation, dated May 22, 2020; 14 pages.

* cited by examiner

MOTOR VEHICLE HAVING AT LEAST ONE HEADLIGHT WITH SEPARATELY ACTUATED LIGHT SEGMENTS

TECHNICAL FIELD

The present disclosure relates to a motor vehicle having at least one headlight for illuminating the surroundings of the motor vehicle and a control device for controlling the headlight, wherein the headlight comprises a plurality of lighting segments that are arranged in the manner of a matrix and that can be actuated separately by the control device for providing a lighting brightness that can be predefined separately for the individual lighting segments, wherein the control parameter predefining the specific lighting brightness for each of the lighting segments can be calculated by the control device in at least one computing step as a function of input parameters that can be provided by at least one vehicle device.

BACKGROUND

The use in motor vehicles of headlights that have light sources that are arranged in the manner of a matrix and the brightness of which may be controlled independently of one another is known. With such light sources arranged in the manner of a matrix, it is possible to flexibly adapt a light distribution provided by the headlight to a driving situation. For example, the light distributions for a low-beam headlight and a high-beam headlight may be provided using the same matrix of light sources, the orientation of the light cone may be adapted to implement an adaptive headlight or the like, or regions may be inten-tionally excepted from the illumination in order to prevent glare for others using the road. The higher the number of light sources used, the more flexibly a light distribution may be adapted.

In order to actuate such a headlight, provided in the motor vehicle is a control device that determines lighting brightnesses for each of the light sources and transmits them via a bus to the power electronics unit of the headlight. Here it is problematic that as the number of independently controlled light sources used increases, the computing power required for a processor used in the control device to determine the individual lighting brightnesses increases. If a high resolution headlight system is used that has 10,000, 100,000, or more lighting segments, such actuation is not possible with currently employed processors, since the latter do not have adequate performance.

The performance of a processor may be increased in that its working speed, that is, its clock speed, is increased. However, this results in rising energy consumption, rising cooling requirements, and higher demands on the specifications of the processor. Use of a faster processor would therefore be technically complex and expensive.

The underlying object of the present disclosure is therefore to provide a motor vehicle that, in contrast, permits less technically complex and more easily implemented actuation of high resolution headlight systems.

BRIEF DESCRIPTION OF THE DRAWINGS

Further advantages and details of the present disclosure result from the following exemplary embodiment and the associated drawings, in which.

DETAILED DESCRIPTION

Figure 1:
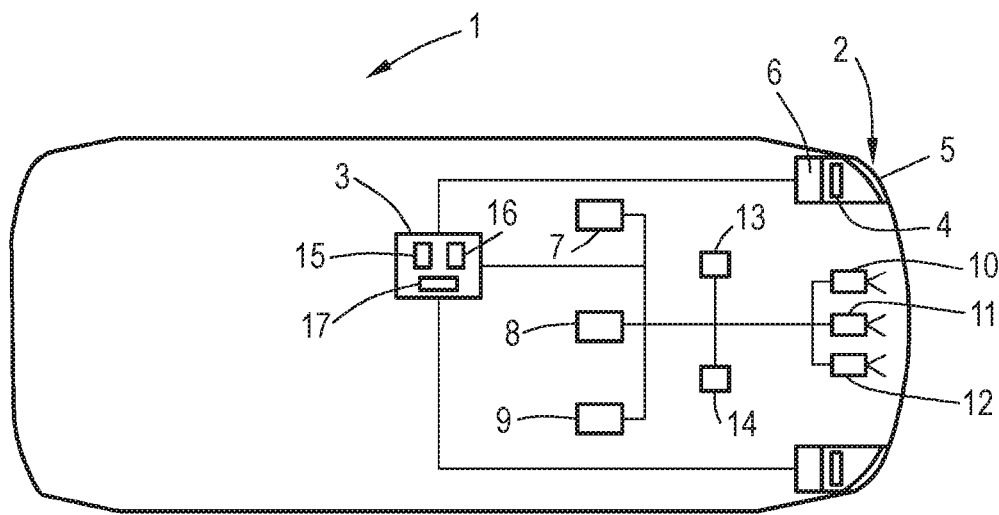
FIG. 1 depicts an exemplary embodiment of a motor vehicle according to embodiments of the present disclosure.

Example embodiments of the present disclosure are directed to using a motor vehicle of the type described in the foregoing, wherein at least the computing step or at least one of the computing steps may be executed in parallel by the control device for a plurality of the lighting segments.

According to embodiments of the present disclosure, use is made of the fact that a majori-ty of the calculations for determining the specific lighting brightness of a lighting segment of a headlight, especially a high resolution headlight, is independent of the calculations for the other lighting segments, so that calculations may be executed in parallel for a plurality of lighting segments. To this end, the control device may have a plurality of computing units working in parallel that are embodied for executing the computing step that may be executed in parallel. The computing units may be hard-wired for specific calculations or may be programmable for executing these calculations. Potentially different input data that are associated with one of the lighting segments may be supplied to each of the computing units, and from these data the output data associated with a specific lighting segment are calculated. A similar computing operation may be applied to the input data. This case is also called "Single Instruction, Multiple Data (SIMD)," according to Flynn's taxonomy of computer architecture. Alternatively, it is possible to apply different computing operations to the different input data. This latter case is also called "Multiple Instruction, Multiple Data (MIMD)."

The parallelization may be accomplished in that the computing step that may be executed in parallel for all lighting segments or for groups of lighting segments is executed in each case within a particular fixed, prespecified group size (e.g., for every eight lighting segments). The parallelization may comprise individual or a plurality of computing steps for determining the lighting brightness. The result of the plurality of computing steps may be a matrix or a graphic that describes the control parameters for each of the individual lighting segments. The described process may be transferred to a colored illumination of the vehicle surroundings. In this case, for example, lighting brightnesses for different illumination colors may be determined separately from one another. The headlight may be actuated by the control device itself, but it is also possible to transfer the control parameters, for example in the form of the previously explained matrix or graphic, via a vehicle bus to a control electronics unit of the headlight.

Each of the lighting segments may comprise an individual lighting means or a plurality of commonly actuated lighting means. The lighting means may be LEDs, for example. It is also possible for a common lighting means to be used for a plurality of or for all lighting segments, wherein the individual lighting segments have filters through which the lighting brightness in a solid angle associated with the lighting segment may be varied. These filters may be embodied, for example, as LCD panels or micromirror arrays. The headlight may comprise at least 10,000 or at least 100,000 lighting segments.

The control device may be a graphics processor or may comprise a graphics processor, wherein the computing step that may be executed in parallel for the plurality of lighting segments may be executed in parallel by the graphics processor. A graphics processor may be a circuit that is optimized for manipulating an image storage element, also called frame buffer. A defined storage region of this image storage element may be associated with each of the lighting segments. The control parameters may be stored in the image storage element. The headlight electronics unit of the actuated headlight may read out the image storage element directly. Here the reading out of the image storage element may occur at a fixed repetition rate. Similar to the field of graphics representation, a plurality of buffers may be used for controlling lighting segments, wherein the determined control parameters are stored in a first buffer and the actuation of the headlight occurs according to the control parameters in a second buffer, wherein the functions of the buffers may be switched according to the calculation of all control parameters of a specific lighting image of the headlight. As explained in the foregoing, it is also possible, however, for the control parameters to be transmitted, in particular in the form of a graphic or matrix, via a vehicle bus to the headlight electronics unit, whereupon the headlight electronics unit actuates the lighting segments according to the control parameters.

The control device may be set up to execute the computing step executed in parallel or at least one of the computing steps executed in parallel in that a computer statement is executed by the control device, which determines in parallel from a plurality of computing parameters associated with one of the lighting segments a result parameter associated with the specific lighting segment, wherein the computing parameter is predefined by the input parameters or at least calculated therefrom in at least one preceding computing step, and the specific control parameter is predefined by the result parameter or is calculated therefrom in at least one preceding computing step and the specific control parameter is predefined by the result parameter or is calculated in a subsequent computing step using the result parameter. This process is a SIMD approach. The computing parameters and the result parameters may be whole numbers or may be provided or determined as floating point figures. It is possible for the computer statement to receive a plurality of computing parameters allocated to the specific lighting segment and to process these in order to determine the specific result parameter. The computer statement may be a command of an instruction set of a processor, in particular a graphics processor, of the control device.

For each of the lighting segments, the result of the computing step executed in parallel or of at least one of the computing steps executed in parallel may be a function of predefined lighting segment information describing at least one property of the specific lighting segment. The lighting segment information may be stored in the control device or may be provided via a bus system of the motor vehicle, in particular as a subset of the input parameters. The lighting segment information may be predefined in the factory and, for instance, describe the position of the specific lighting segment in the matrix of the lighting segments that form the headlight. The lighting segment information may also or may alternatively describe a solid angle that is illuminated by the lighting segment. The lighting segment information may be determined in the context of calibrating the headlight, in the context of maintenance, or automatically using vehicle sensors.

Using the control device, as a function of the input parameters, one of a plurality of predefined light patterns may be selected that describes a solid angle to be illuminated using the lighting segments, wherein, for at least one subset of the lighting segments, the result of the computing step executed in parallel or of at least one of the computing steps executed in parallel is a function of the selected light pattern. A light pattern may describe, for example, a high-beam headlight or a low-beam headlight. In the context of the at least one computing step executed in parallel, it may be determined for each of the lighting segments whether it illuminates the solid angle to be illuminated or a solid angle disposed outside of the solid angle to be illuminated. This corresponds to a raster of the light pattern. It is possible that a first control parameter is determined for lighting segments whose emission angle is disposed completely within the solid angle to be illuminated, and a second control parameter is determined for those lighting segments whose emission angle is disposed outside of the solid angle to be illuminated. However, the light pattern may also be defined such that the change in the lighting brightness on the edge of the solid angle to be illuminated occurs continuously.

The light patterns may be definitely predefined, that is, may always lead to identical light distribution of the headlight. However, it is also possible for the light pattern to have one or a plurality of parameters whose predefinition may be used to adjust the specific light pattern. For example, in a light pattern that is associated with a high-beam, an azimuth angle may be predefined, according to which azimuth angle the high-beam is to be pivoted in the driving plane. In this way it is possible to implement adaptive headlights.

Using the vehicle device, the input parameters may be predefined such that they comprise movement data that are a function of an instantaneous and/or predicted future vehicle movement, wherein, for at least some of the lighting segments, the result of the computing step executed in parallel or of at least one of the computing steps executed in parallel is a function of the movement data. The movement data may describe the above men-tioned azimuth angle for an adaptive headlight, for example, since said azimuth angle is a function of a predicted future direction of travel. For determining the movement data, the motor vehicle may have an ego data detection device that may be used to detect, for example, the steering angle, yaw rate, and/or velocity of the motor vehicle. In addition or alternatively, the motor vehicle may predict future vehicle movements in that environmental data are evaluated. This is possible, for example, in that the position of the motor vehicle is determined via a position determination device, for example, a satellite-supported position detection system, and the instantaneous position of the motor vehicle is compared to map data in order to determine a predicted future travel route. A corresponding functionality may thus be prepared using a navigation device of the motor vehicle. It is also possible to obtain environmental data, such as, for example, the future course of a street, using an evaluation of sensor data from environmental sensors of the motor vehicle. The environmental data and ego data may be evaluated to detect the instantaneous or predicted motor vehicle movement and to determine the movement data therefrom.

Using the vehicle device, the input parameters may be predefined such that, for at least one relevant object in the vehicle surroundings, they comprise object information relating to the object, wherein, for at least one subset of the lighting segments, the result of the computing step executed in parallel or of at least one of the computing steps executed in parallel is a function of the object information. The object information may be sensor data from one or a plurality of sensors on the motor vehicle, for example from at least one camera, radar, and/or lidar of the motor vehicle. However, object information can also be provided using vehicle systems that process corresponding sensor data and predefine as object information, for example, an object type, an object position in the vehicle surroundings, and/or a solid angle with respect to the headlight or motor vehicle in which a corresponding object is disposed. The object information may also comprise illumination information that describes how a corresponding object is to be illuminated. Object information may be predefined in the form of object lists using one or a plurality of vehicle systems, wherein an object list may comprise objects that are to be marked using a corresponding light pattern and/or are not to be illuminated. Non-illumination of objects may be advantageous, for example, if glare from a high-beam headlight is to be prevented for others using the road. Marking of objects may occur, for example, for pedestrians or animals on the side of the road. Methods for determining objects that are to be marked using a headlight or that are not to be illuminated during illumination of surroundings are known in the prior art and shall therefore not be explained in detail.

The input parameters or 2D vector data determined from the input parameters using the control device may describe a 2D polygon list of 2D polygons of a light distribution, different control parameters or control parameter courses being associated with each of the 2D polygons, wherein the specific control parameters of the lighting segments may be calculated in parallel for a plurality of lighting segments from the 2D polygon list using the control device. This corresponds to a raster of the corresponding 2D polygons, as is known from graphics processing. A corresponding procedure is particularly advantageous when the control device is a graphics processor or comprises a graphics processor, since these graphic processors are frequently optimized for corresponding rastering. A control parameter course may be described, for instance, in that a plurality of control parameters are predefined for a plurality of corners of the specific 2D polygon. The control parameter of the individual lighting segments may be determined by interpolating a plurality of these control parameter within the specific 2D polygon. The 2D polygons may be con-vex, and may especially be tri-angles. The 2D polygons can complement one another to create an illumination surface having the same geometric shape as the matrix-like ar-rangement of the lighting segments.

A pulse width for a control voltage and/or a control current for the specific lighting segment may be calculated as a control parameter using the control device. This permits a particularly simple embodiment of a control electronics unit for a headlight, since the control current or the control voltage having this pulse width may be used for instance directly for operating LEDs forming the lighting segments or for actuating filters associated with individual lighting segments, which filters can be illuminated equally using a common light source. Individual LCD pixels or micromirrors may be actuated as filters.

Figure 2:
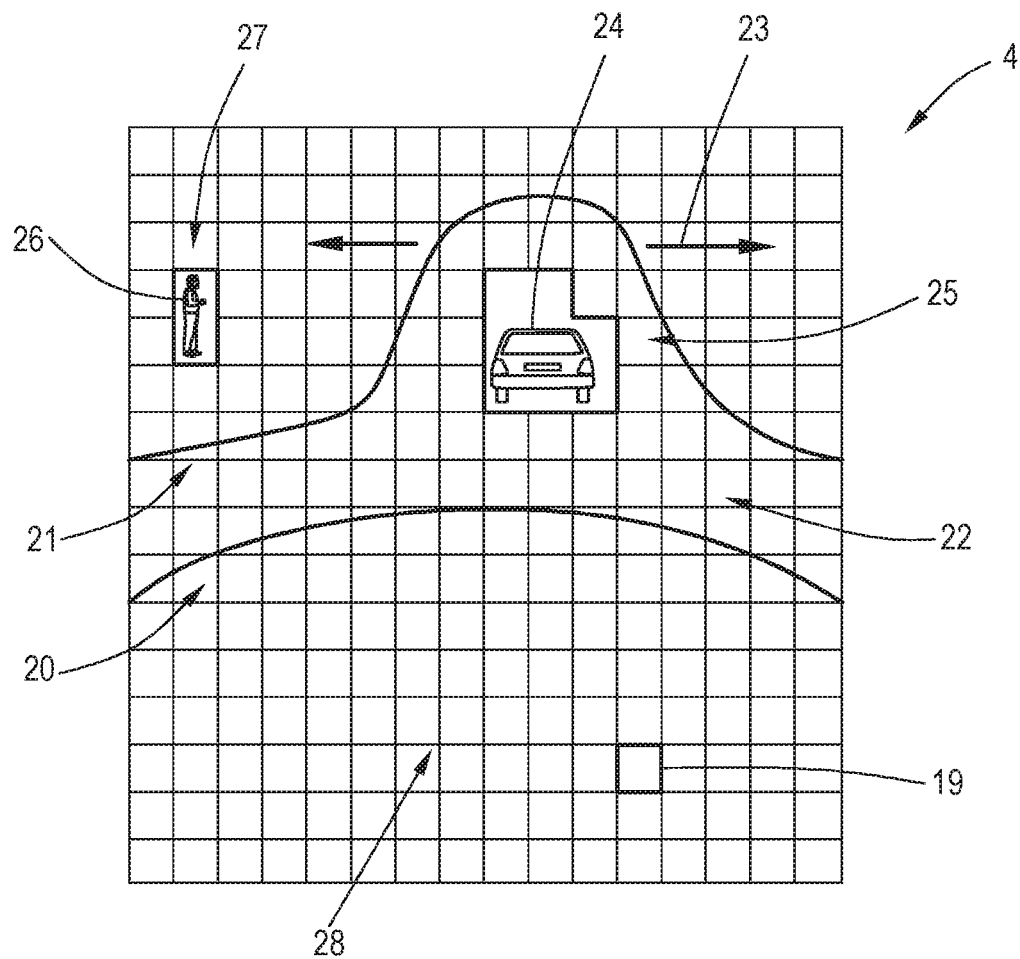
FIG. 2 depicts a light panel of a headlight of the motor vehicle depicted in FIG. 1 and an example of the actuation of the individual lighting segments of the light panel in a traffic situation according to embodiments of the present disclosure.

FIG. 1 depicts a motor vehicle 1 having two headlights 2 for illuminating the surroundings of the motor vehicle 1 and a control device 3 for controlling the headlights 2. The headlight 2 comprises a light panel 4 that comprises a plurality of lighting segments 19 arranged in the manner of a matrix, as illustrated in FIG. 2. The lighting segments 19 may be actuated using the control device 3 in order to provide a lighting brightness that may be predefined separately for the individual lighting segments 19. The control device 3 is embodied for calculating the specific lighting brightness for control parameters describing the individual lighting segments 19 from the input parameters provided by the vehicle devices 7, 8, 9. The calculation is executed such that at least one computing step is executed in parallel for a plurality of the lighting segments 19 by the control device 3. To this end, the control device 3 has a graphics processor 15 having an associated image storage element 16 and a bus interface 17. The vehicle devices 7, 8, 9 provide input parameters to the control device 3 via the bus interface 17. From these input parameters, the graphics processor 15 calculates a lighting image that comprises, for each of the lighting segments 19, a control parameter describing the specific lighting brightness, for example a pulse width for pulse width modulation of a current of a light diode of the lighting segment. This lighting image is transmitted via the vehicle bus to the control electronics unit 6 of the headlight 2, which control electronics unit correspondingly actuates the light panel 4. The lighting brightness provided by any lighting segment 19 is radiated by an optical unit 5 of the headlight, in particular a diffuser lens, in a solid angle associated with the lighting segment 19. For reasons of simplicity, FIG. 2 depicts only 256 of the lighting segments 19, which are arranged in a 16×16 matrix. In the motor vehicle 1 illustrated, a control for the lighting segments 19 is used that is optimized for the use of a plurality of lighting segments, in particular at least 10,000 or at least 100,000 lighting segments. The figures depict a relatively small number of lighting segments 19 for reasons of simplicity.

The individual lighting segments may each have an LED as controllable light source. In alternative exemplary embodiments, the lighting segments could also comprise a plurality of commonly actuated light-emitting diodes, could be formed by one or a plurality of organic light-emitting diodes, or could each be formed by a filter element that permits the light from a common light source to pass with variable intensity. An LCD panel or a micro-mirror array may be used as filter element, for example.

The motor vehicle 1 has a plurality of vehicle devices 7, 8, 9, each of which provides input parameters to the control device 3 in order to influence a light distribution radiated using the headlight 2. The vehicle device 7 predefines a basic light pattern to be used and parameterizes this light pattern. The vehicle device 7 provides as an input parameter information about whether a light pattern that corresponds to a low-beam headlight should be radiated, or whether a light pattern that corresponds to a high-beam headlight should be radiated. A driver may manually select between high-beam headlight and low-beam headlight. Alternatively, the vehicle device 7 could determine independently, as a function of detected ego data and/or environmental data, whether a high-beam or a low-beam should be used. The vehicle device 7 also provides to the control device 3 movement data that are a function of a predicted future vehicle movement and that describe a predicted change in the direction of travel. The predicted change in the direction of travel may be provided as an azimuth angle relative to the longitudinal vehicle axis. This azimuth angle may be used for parameterizing the selected light pattern in order to implement an adaptive headlight in the motor vehicle 1.

For predicting the vehicle movement, and for determining object information for objects disposed in front of the motor vehicle, explained in the following, the vehicle devices 7, 8, 9 may evaluate ego data that describe a status of the motor vehicle 1 itself and environmental data that describe the vehicle surroundings. For acquiring environmental data, on the one hand, three sensor devices 10, 11, 12 are provided, the sensor device 10 being a camera, the sensor device 11 being a radar sensor, and the sensor device 12 being a lidar sensor. On the other hand, environmental data may be provided using the navigation system 13. A position detection device (not shown) determines a position of the motor vehicle 1 in world coordinates using the navigation system 13, and a predicted segment travelled in the future is predicted using an evaluation of map data stored in the navigation device 13 and segment data describing this segment are provided as a subset of the environmental data. Methods for predicting segments traveled in the future using navigation systems are known in the prior art and shall therefore not be explained in detail.

An ego data detection device 14 that can comprise one or a plurality of sensors that detect ego data of the motor vehicle is used for detecting ego data of the motor vehicle, for example a steering angle, a yaw rate, and/or velocity of the motor vehicle.

The vehicle device 8 provides a glare-free high-beam headlight. With a glare-free high-beam light, others using the road, for instance motor vehicles, in front of the motor vehicle are detected and, to prevent glare for these others using the road, regions in which such others using the road are disposed are illuminated with a lower intensity. The environmental data explained in the foregoing are provided to the vehicle device 8 via the vehicle bus. The vehicle device 8 executes an object detection in these environmental data in order to identify others using the road for whom glare is to be avoided and determines a specific solid angle in which such others using the road are disposed relative to the motor vehicle 1. The vehicle device 8 provides a list of detected objects for which glare is to be avoided with the associated solid angles as input parameters to the control device 3.

The vehicle device 9 provides a marking function that may be used to highlight certain objects in the vehicle surroundings using corresponding illumination. For example, lanes or objects disposed in the lane surroundings, for example, pedestrians or animals, may be highlighted in order to assist the driver while he is driving. As explained for the vehicle device 8, corresponding objects are detected using the vehicle device 9, solid angles are associated with the objects, and an object list that comprises the objects to be marked and the solid angles in which they are disposed is prepared as a subset of the input parameters to the control device 3.

Figure 3:
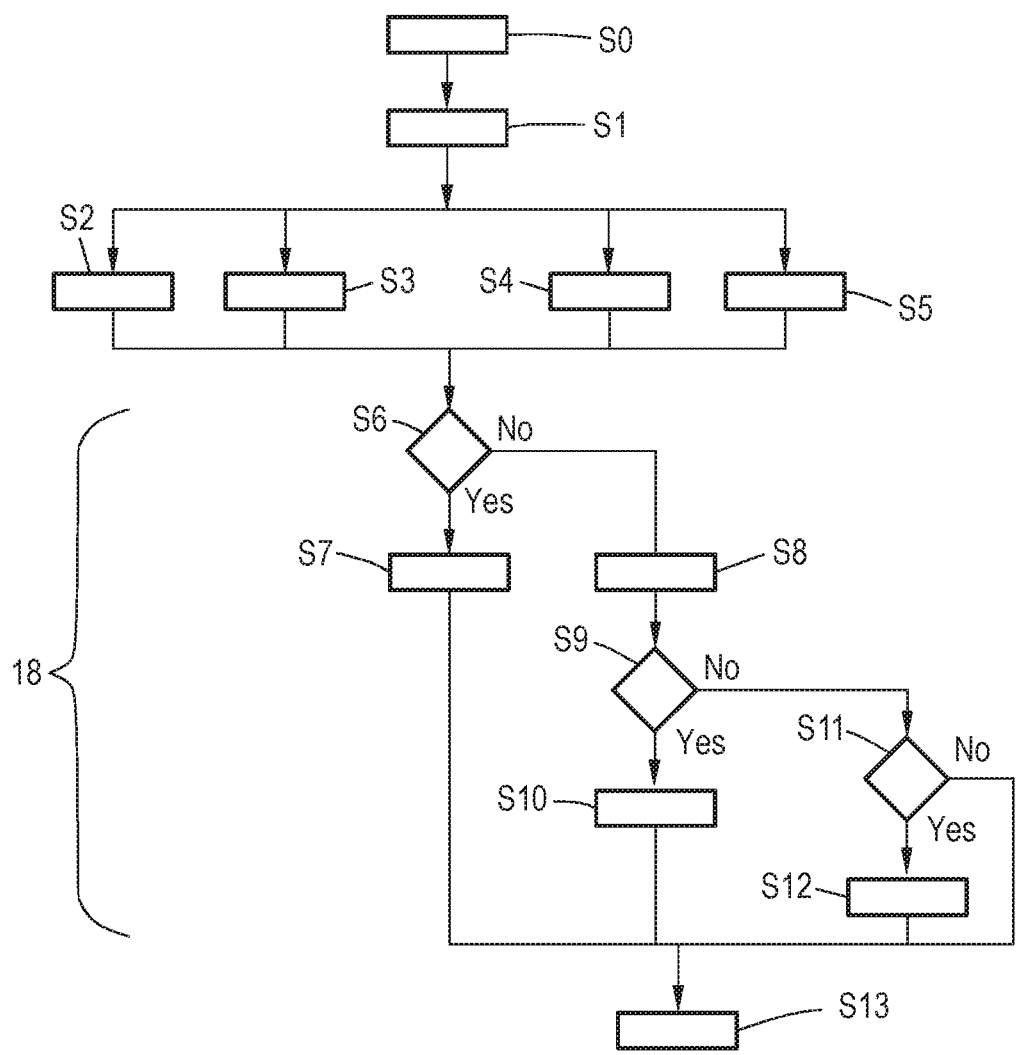
FIG. 3 is a flowchart that illustrates the calculation of the control parameters for the individual lighting segments using the control device of the motor vehicle illustrated in FIG. 1 according to embodiments of the present disclosure.

The various lighting functions that are provided using the headlight 2 in conjunction with the control device 3 are depicted schematically in FIG. 2. The calculation of the individual control parameters for the lighting segments 19 for providing these lighting functions is explained with reference to the flowchart provided in FIG. 3. The steps shown in section 18 of the flowchart are executed entirely or partially in parallel, wherein the parallelization is executed by the graphics processor 15 using SIMD commands in which result parameters associated specifically with one of the lighting segments 19 are determined in parallel from a plurality of computing parameters, each associated with one of the lighting segments 19, using each calculation instruction.

In a prepared step S0, lighting segment information that describes at least one property of the corresponding lighting segment is predefined for each lighting segment. In the sim-plest case, the lighting segment information describes the position of the specific lighting segment 19 in the matrix of the lighting segments 19, that is, for example, the line and column in which the corresponding lighting segment 19 is disposed. However, it is also possible, for example in the context of calibrating the headlight 2, to determine a solid angle segment that is illuminated by the specific lighting segment 19, wherein the lighting segment information describes this solid angle segment. In the context of the parallel determination of the control parameters, the lighting segment information permits taking into account the position of the lighting segment 19 in the lighting panel 4 and thus permits taking into account the "pixel limits" of the lighting segment 19 or of the illuminated lighting angle of the lighting segment 19.

In step S1, environmental data and ego data of the motor vehicle are determined using the environmental detection device 10, 11, 12, the navigation system 13, and the ego data detection device 14, as described in the foregoing. In steps S2 through S5, using the vehicle devices 7, 8, 9, input parameters are determined from the ego data and environmental data and are provided to the control device 3. In step S2, using the vehicle device 7 it is determined whether a low-beam headlight or a high-beam headlight should be used. The position of an operating element is read out for this. As stated in the foregoing, it would also be possible to perform such a determination automatically. In addition, in step S3 the predicted future direction of travel was determined using the vehicle device 7 and is provided to the control device 13 in the form of an azimuth angle. The lighting direction of a high-beam headlight may be adapted as a function of this azimuth angle, that is, a possible lighting pattern may be adapted in order to implement an adaptive light.

In step S4, using the vehicle device 8, an object detection is executed in the environmental data that were generated by fusing the sensor data from the environmental detection devices 10, 11, 12. Objects, for example the object 24 depicted in FIG. 2, a motor vehicle that is not to be illuminated or is to be illuminated with a lower intensity in order to prevent glare, are detected using object classification. Detected objects, together with a solid angle that describes the position of the object relative to the vehicle, are provided as an object list as input parameters to the control device 3. Correspondingly, in step S5, the vehicle device 9 determines objects that are to be marked using illumination, for example a traveled lane or the object 26 depicted in FIG. 2, which is a pedestrian.

In section 18 of the flowchart, that is, in steps S6 through S12, a plurality of computing steps are executed in parallel for a plurality of lighting segments 19 by the graphics processor 15 in order to determine specific control parameters for the lighting segments 19 from the input parameters as a function of the lighting segment information provided in step S0. Parallelization may occur for all lighting segments or for groups of lighting segments, for example for every eight lighting segments. The individual steps S6 through S12 of the parallel calculation are explained in the following only for one of the lighting segments 19, but run correspondingly for all lighting segments 19.

In step S6, first, using the input parameters, it is determined which of a plurality of predefined but potentially adjustable light patterns should be output. In the following, as an example, a sequence for a control device 3 is described that provides only two different predefined light patterns, specifically a static light pattern for a low-beam headlight and a dynamic light pattern with additional lighting functions for a high-beam headlight. In step S6, therefore, there is a check of whether the input parameters describe that a low-beam headlight should be used. If this is the case, in step S7 a predefined control parameter is associated with each of the lighting segments 19, so that the lighting segments 19 in the region 28 below the line 20 illuminate with a predefined brightness and the lighting segments 19 disposed above the line 20 in FIG. 2 essentially have a lighting brightness of 0. The method is then immediately continued with step S13, in which the corresponding lighting image, that is, a matrix of the control parameters, is transmitted to the control electronics unit 6 of the headlight 2.

However, if a dynamic high-beam headlight is to be radiated, the method is continued with step S8. In this step, initially provisional control parameters for the lighting segments 19 are determined such that all lighting segments 19 below the line 21 in FIG. 2, that is the lighting segments 19 in the regions 22 and 28, illuminate with a predefined brightness, while control parameters that correspond to a lower brightness or for which the corresponding lighting segments are deactivated are associated with the lighting segments 19 disposed above the line 21. As is indicated by the arrow 23, however, the shape of the delimiting line 21 may shift as a function of the azimuth angle, so that a radiated light distribution may be pivoted to the left or right in order to provide an adaptive headlight.

In step S8, it is determined for each specific lighting segment 19 whether or not this lighting segment is disposed below the correspondingly adapted line 21. To check this, a mathematical condition may be predefined that determines whether the specific lighting segment 19 is disposed below the line 21 as a function of the azimuth angle and the lighting segment information. The provisional control parameters are written into the image storage unit 16.

In step S9, it is checked for the specific lighting segment 19 whether an object from the object list provided using the vehicle device 8, for which object a glare should be avoided, is disposed in the angle region illuminated by the lighting segment 19. If this is the case, in step S10 the control parameter for the corresponding lighting segment 19 is set to a predefined value so that if the lighting segment 19 is disposed in the regions 22, 28, its lighting brightness may be reduced to prevent glare. This is depicted as an example in FIG. 2 for the lighting segments 19 in the region 25, whose lighting brightness is reduced to prevent glare to the driver of a motor vehicle.

If it is determined in step S9 that for the specific lighting segment there is no object present for which glare is to be avoided, in step S11 there is a check of whether an object in the object list that is provided by the vehicle device 9 and that comprises objects to be marked is present that is disposed in the solid angle region associated with the lighting segment 19. If this is the case, in step S12 a control parameter through which the lighting brightness of the corresponding lighting segment 19 may be increased is associated with the lighting segment 19. This is depicted as an example in FIG. 2 for the lighting segments 19 in the region 27, in which a pedestrian is to be marked.

By predefining provisional control parameters in step S8 and, in some circumstances, making adjustments in step S10 and step S12, a lighting image is generated that, on the one hand, provides the basic light pattern of a high-beam headlight that takes into account future travel on a curve, and, on the other hand, prevents glare to others on the road and marks certain objects in the surroundings. The lighting image is transmitted to the control electronics unit 6 of the headlight 2 in step S13 using the vehicle bus in order to radiate this lighting image.

The invention claimed is:

1. A motor vehicle having at least one headlight for illuminating surroundings of the motor vehicle and a control device for controlling the at least one headlight, wherein the at least one headlight comprises a plurality of lighting segments that are arranged in a manner of a matrix, and can be actuated separately by the control device for providing a lighting brightness that can be predefined separately for the individual lighting segments, wherein a control parameter predefining the lighting brightness for each of the lighting segments can be calculated by the control device in at least one computing step for each of the lighting segments as a function of input parameters that can be provided by at least one vehicle device, wherein the input parameters comprise one or more detected objects and corresponding positions of the detected objects relative to the motor vehicle, and wherein the control device executes the at least one computing step for a first lighting segment in parallel to the at least one computing step for at least one other lighting segment, wherein the at least one computing step for the first lighting segment comprises determining whether at least one of the one or more detected objects is disposed in a region illuminated by the first lighting segment, and calculating the control parameter predefining the lighting brightness of the first lighting segment based at least in part on whether a first solid angle associated with the first lighting segment is to be illuminated and wherein, when at least one of the one or more detected objects is disposed in a region illuminated by the first lighting segment, the predefined lighting brightness of the first lighting segment is increased or dimmed and, wherein the at least one computing step for the at least one other lighting segment comprises determining whether at least one of the one or more detected objects is disposed in a region illuminated by the at least one other lighting segment, and calculating the control parameter predefining the lighting brightness of the at least one other lighting segment based at least in part on whether a second solid angle associated with the at least one other lighting segment is to be illuminated, and wherein, when at least one of the one or more detected objects is disposed in a region illuminated by the at least one other lighting segment, the predefined lighting brightness of the at least one other lighting segment is increased or dimmed.

2. The motor vehicle according to claim 1, wherein the control device comprises a graphics processor, and wherein the at least one computing step for each of the lighting segments may be executed by the graphics processor.

3. The motor vehicle according to claim 1, wherein the control device is configured to execute the at least one computing step for the first lighting segment in parallel by executing a computing statement that determines a result parameter associated with the first lighting segment in parallel to a plurality of computing parameters associated with the at least one other lighting segment, wherein the result parameter is predefined by the input parameters, or at least calculated therefrom, and the control parameter is predefined by the result parameter, or is calculated in a subsequent computing step using the result parameter.

4. The motor vehicle according to claim 1, wherein for each of the lighting segments, a result of the at least one computing step is a function of predefined lighting segment information describing at least one property of the lighting segment.

5. The motor vehicle according to claim 1, wherein the control device is configured to, as a function of the input parameters, select one of a plurality of predefined light patterns that describes a third solid angle to be illuminated using the lighting segments, wherein, for at least one subset of the lighting segments, the result of the at least one computing step is a function of the selected light pattern.

6. The motor vehicle according to claim 1, wherein, the input parameters comprise movement data that are a function of an instantaneous and/or predicted future vehicle movement, wherein, for at least some of the lighting segments, a result of the at least one computing step is a function of the movement data.

7. The motor vehicle according to claim 1, wherein the input parameters comprise object information relating to at least one relevant object in the surroundings of the motor vehicle, and wherein, for at least one subset of the lighting segments, a result of the at least one computing step is a function of the object information.

8. The motor vehicle according to claim 1, wherein the input parameters, or 2D vector data determined from the input parameters using the control device, describe a 2D polygon list of 2D polygons of a light distribution, wherein different control parameters or control parameter courses are associated with each of the 2D polygons, and wherein the control parameters of the respective lighting segments may be calculated in parallel for a plurality of lighting segments from the 2D polygon list using the control device.

9. The motor vehicle according to claim 1, wherein the control device is configured to calculate, as a control parameter, a pulse width for a control voltage and/or a control current for each lighting segment.

* * * * *